April 8, 1969   SEIJI ARAKAWA ET AL   3,437,489
PROCESS FOR PRODUCING FISHMEALS

Filed Oct. 7, 1964

INVENTOR.
SEIJI ARAKAWA,
SUNAO TOMINAGA & TSUNEO TERASE
BY
Mason, Fenwick & Lawrence
ATTORNEYS United States Patent Office
3,437,489
Patented Apr. 8, 1969

3,437,489
PROCESS FOR PRODUCING FISHMEALS
Seiji Arakawa, Sunao Tominaga, and Tsuneo Terase,
Tokyo, Japan; said Terase assignor to said Arakawa, said Tominaga, and Nichiro Gyogyo Kabushiki Kaisha, Tokyo, Japan, a corporation of Japan
Filed Oct. 7, 1964, Ser. No. 402,152
Claims priority, application Japan, June 20, 1964,
39/34,307
Int. Cl. A23k 1/10; A23d 5/04
U.S. Cl. 99—7                            3 Claims

ABSTRACT OF THE DISCLOSURE

Process for producing fishmeal for use as animal feed while preventing oxidation of oil and fat therein by grinding fish, adding water thereto to reduce the viscosity, heating instantaneously to about 50° to 65° C., adding hydrogen peroxide in an amount of 0.03 to 0.08% by weight of the fish meat to produce antioxidative ability in the residual fat and oil of the fishmeal, separating solids from liquids and drying the separated solids as rapidly as possible.

---

This invention relates to processes for producing fishmeals which are of very high quality as feed by preventing the oxidation of fat and oil in fishmeals.

According to a conventional process for producing fishmeals, raw fish in the whole or ground form are cooked in hot water directly, indirectly, or by steam blowing, and after pressing or centrifugal separation of solids from liquids, the solids are dried and then ground to a powder.

In such a conventional process, fish are heated at a temperature around 100° C. so that the fish meat protein may be coagulated. However, the fish meat protein will begin to thermocoagulate at about 40° C. and will complete the thermocoagulation around 80° C. If the fish meat protein is heated to a higher temperature than 80° C., the protein will thermocoagulate and will exudate the liquid and oil and at the same time collagen will be changed to gelatin which becomes water-soluble and transfers into the liquid.

That is to say, if the heating temperature of fish meat approaches to 100° C., it will become easier to separate the liquids by pressing or centrifugal separation. In the conventional process for producing fishmeals, fish is cooked at a high temperature around 100° C. in order to produce presscake containing as little water and oil as possible, to make the drying stage easy and to reduce the contents of the fat and oil in the dried fish meal.

Cooking fish around 100° C. makes it easy to mechanically remove the liquid from the fish body. However, even at a temperature below 100° C., it is possible to press or centrifugally separate the liquids.

As mentioned above, fish meat will begin to thermocoagulatae about 40° C. At 70° C., the myosine and myogen constituting the greater part of the fish meat protein will completely coagulate and only 2 to 3% of the blood albumin will remain as an uncoagulated protein. Further, even at a low temperature below 70° C., when the protein is thermocoagulated, the tissue of fat will be damaged so that the liquids may be removed by such operation as pressing or centrifugal separation, and the amount of separated liquids will not be so different from that of the liquids removed at a temperature around 100° C. Therefore, 100° C. cooking is not only uneconomical in the consumption of heat but also undesirable because the essential nutrients such as the extracts, vitamins and unknown growth factor will be left in the separated liquids.

Generally, 100° C. cooking has conventionally been used because there has been no proper method of preventing the quick oxidation and decomposition of the fat and oil in a fishmeal, and it was necessary to reduce the contents of the fat and oil in the fishmeal.

It is possible but costly to reduce the amount of fat and oil in fishmeals by dissolving them in such solvents as ethyl alcohol, benzene or gasoline.

On the other hand, there are several antioxidants for preventing the oxidation of fat and oil in fishmeals such as butyl hydroxy toluene, butyl hydroxy anisol and isoamyl gallate. But, after the effective period, a severe oxidation will occur. Therefore, their effect cannot be expected to be sufficiently high for fishmeals to be stored for a long time.

The present invention attempts to overcome such conventional disadvantages and to produce fishmeals of stable and nutritious quality at low cost by preventing the oxidation of fat and oil in fishmeals.

The essential feature of this process for producing fishmeals comprises grinding fish, thermocoagulating at a comparatively low temperature of 50 to 65° C. in a steam injection system, adding thereto a proper amount of hydrogen peroxide, separating solids from liquids and then quickly drying the solids.

The higher the thermocoagulation temperature is, the more active is the oxidation of fat and oil in the fishmeal. But, only by cooking at the low temperatures, the oxidation of the fat and oil in the fishmeal can be prevented.

Further, by adding antioxidants like butyl hydroxy anisol, butyl hydroxy toluene after low temperature heating, the oxidation of fat and oil in the fishmeal can be prevented to some extent. However, the present amount of such antioxidants allowed by each nation's law is not enough for the long term prevention of the oxidation.

The production of fishmeal by thermocoagulating of most proteins in the fish at such lower temperature as 50 to 65° C. is possible in a laboratory because the amount for one batch is small. According to the conventional process, however, it is difficult to handle large amounts of fish at one time in order to provide the optimum temperature without any partial overheating.

Therefore, it takes a considerably longer time to provide the above required temperature to the fish in case of the factory scale production by the batch system of the conventional process. However, the above range of temperature corresponds to the optimum temperature of protein digestive enzymes in the fish body, and therefore the fish meat is rapidly digested to a liquid, the yield of products becomes low and it becomes difficult to operate the solid-liquid separation.

According to the present invention, the disadvantages mentioned above may be overcome by the following procedures:

(a) Fish are ground by the grinder with about 4 to 8 mm. plate mesh, about 10 to 30% water is added thereto so that the mixture may be of a proper viscosity and be fed to an instantaneously heating apparatus by a constant volume pump.

Figure 1:
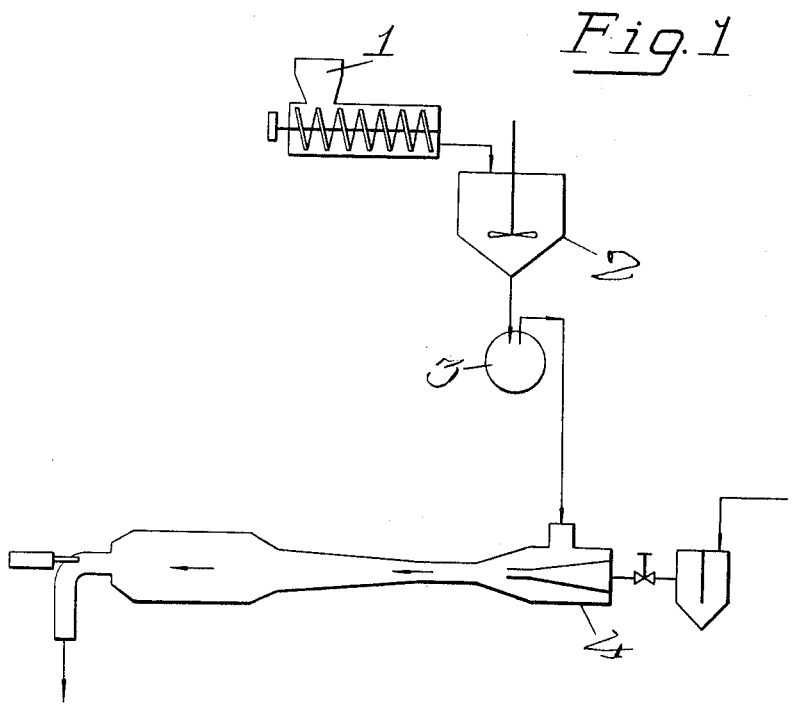
FIG. 1 shows a perspective view of a steam injection system.
Figure 2:
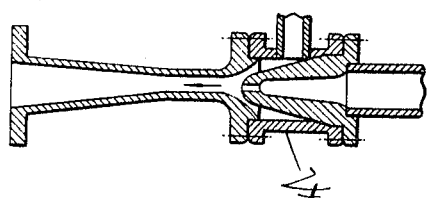
FIG. 2 is a longitudinal section of the jet mixer.

(b) The instantaneous heating apparatus is illustrated in FIGURES 1 and 2. The fish meat gruel fed in the apparatus is mixed with injected steam so that the instantaneous heat exchange may occur and the temperature of the ground fish may reach the desired temperature.

(c) The fish meat gruel mixed up and thermocoagulated by steam injection is heat exchanged in a very short time, therefore little protein is digested by enzymes. If the gruel is quickly fed to the next solid-liquid separating stage, no difference can be seen in the yield of the fishmeal compared with the conventional process. It is very easy to control automatically the required heating temperature by steam.

Further, the present invention attempts to prevent the oxidation of fat and oil in the meal by making hydrogen peroxide water to react under specific conditions and to maintain a stable quality for a long time. After this operation, solid-liquid separating stage is needed and no trace of hydrogen peroxide can be seen in the fishmeal products because hydrogen peroxide is completely decomposed during the drying stage and consequently will not unfavorably affect the nutritional and sanitary conditions.

Undiluted hydrogen peroxide water of 30% concentration may be poured into a receptacle tank with stirring, but usually diluted hydrogen peroxide water of about 0.3% is added with mixing and stirring.

Although the amount of hydrogen peroxide added to fish meat is somewhat variable according to the kind of fish, the content of fat and oil and the freshness of fish meat, the optimum amount of 100% equivalency hydrogen peroxide per kg. of fish meat ranges from 0.3 to 0.8 gram, preferably 0.5 to 0.65 gram.

The proper reading temperature of hydrogen peroxide water on fish meat is 50 to 65° C. The fish meat is heated by the above mentioned instantaneous heating apparatus and a required amount of hydrogen peroxide water is immediately added to fish meat with mixing and stirring. If hydrogen peroxide water of above concentration is added to small migration fish such as sardine, anchovy, herring, mackerel pike, mackerel and horse-mackerel, their scales and skins turn light green. When they are treated at the reaction temperature of 50 to 65° C., no pronounced fishy odor will be noticed, but, at the temperature above 65° C., strong fishy odor will soon be smelled. Further, at the temperature below 50° C., no color reaction will be seen.

The test proves that no fat and oil in the fishmeal oxidate and decompose for a long time, when fish are treated at the satisfactory reaction temperature and concentration of hydrogen peroxide.

The mechanism of this reaction is not known to us yet. Thus, it is proved by experience that the present invention will produce the excellent fishmeal, but the mechanism of chemical reaction has not yet been clarified.

If a portion of the separated liquid is repeatedly used instead of fresh water added to the ground fish meat in order to reduce the viscosity at the beginning of the process, heat conservation will be effected. It is advantageous to use this operation in manufacturing the concentrated fish solubles from which fat and oil are removed, because it increases the ratio of solids and decreases water in the liquids, and consequently makes concentration easy.

The raw presscake is fed to a dryer in the next stage. When a small amount (0.001 to 0.002%) of the antioxidant like butyl hydroxyl toluene or butyl hydroxy anisol is added to the cake treated with hydrogen peroxide and is dried after stirring, the oxidation of fat and oil in the fishmeal can be prevented for a longer period due to the multiplied action of the hydrogen peroxide and antioxidant.

The fishmeal is usually dried by a rotary dryer using direct fire or indirect heating apparatus, but in this process so many hours are required for drying and so high a temperature is given to the meal during drying that the fat and oil in the fishmeal are quickly oxidized in the drying stage. In the present invention, the fish meat cooked at the low temperature and treated with hydrogen peroxide is far slower in oxidation compared with the conventional fishmeals even under the above drying conditions, but it is difficult to maintain the effect for a long time. Therefore, we should select an apparatus in order to keep the product temperature below 70° C. during drying and to finish drying within 2 hours.

For this purpose, a pneumatic conveying dryer is desirable.

Tables 1 to 5 show the difference of the progress of oxidation between fishmeals produced by the present process and by the conventional process from the viewpoint of the analytical values of the characteristics of fat and oil. According to the present invention, the fat and oil in the fishmeal are very stable under such undesirable storage conditions as 30° C., and 70% relative humidity.

According to the process of the present invention, the taste, odor and color of fishmeal is good enough to maintain a stable quality for a long time. Table 6 is the result of analyses of amino acids found in fishmeals of the present process and of the conventional one.

From these results, it is observed that there is almost no difference between the two in the distribution and content of amino acids which compose proteins. It may be also understood that, according to the present invention, the oxidation of fat and oil in the meal is prevented but the protein itself is substantially the same as that made by conventional process.

The fat and oil of the fishmeal contain as their major ingredient unsaturated fatty acid which is not toxic by itself. But the oxide, particularly peroxide of unsaturated fatty acid oxidated by oxygen in the air is very toxic and the fishmeals containing a large amount of oxidized fish oil are undesirable for the growth of the domestic animals.

The fishmeals of the present invention promote the growth of animals very well because the oxidation of fat and oil is favorably prevented. Tables 7 to 9 are the results of the breeding tests made on the rats of Wistar species of the same litter and the comparisons of the conventional fishmeals with the present white meals of the highest quality.

From these tables, the product of the present invention is not only superior to the conventional process but is superior to the white meal. That is to say, according to the present invention, it is possible to produce the fishmeal having a higher feeding efficiency than white meal, even in case of using raw materials like sardines which originally belong to the brown meals.

Further, Table 10 is the result of comparisons of the protein digestive rate of the fishmeals produced by the conventional process with that of the fishmeals produced by the present invention, using fowls of White Leghorn with artificial anus.

Thus the product of the present invention shows a higher digestive rate apparently than the conventional process.

Analyses of fat and oil extracted from fishmeals were preserved even at 30° C. and in a relative humidity of 70%.

Sample No. 1: A fishmeal produced by the present process using 0.54 gram of $H_2O_2$ for 1 kg. of horse-mackerels at a cooking temperature of 55° C. and under drying conditions of a product temperature of 44° C. for 2 seconds.

Sample No. 2: A fishmeal produced using 0.0075 gram of butyl hydroxy toluene for 1 kg. of horse-mackerels at the same cooking temperature and under the same drying conditions as in Sample No. 1. But hydrogen peroxide is not added.

Sample No. 3: A fishmeal produced by the present process by using 0.54 gram of $H_2O_2$ and 0.0075 gram of butyl hydroxy toluene for 1 kg. of horse-mackerels at the same cooking temperature and under the same drying conditions as in Sample No. 1.

Sample No. 4: A fishmeal cooked and dried by low temperature adding nothing to horse-mackerels. Cooking temperature and the drying conditions are same as in Sample No. 1.

Sample No. 5: A fishmeal produced by the conventional process from horse-mackerels at a cooking temperature of 100° C. and under drying conditions of 80° C. for 3 hours.

TABLE 1.—IODINE VALUES

| Days | 0 | 4 | 8 | 16 | 28 | 38 | 49 | 59 |
|---|---|---|---|---|---|---|---|---|
| Samples: | | | | | | | | |
| No. 1 | 159.0 | 151.4 | 162.5 | 157.7 | 158.3 | 156.3 | 158.5 | 156.9 |
| No. 2 | 155.9 | 149.2 | 152.6 | 148.1 | 148.6 | 146.9 | 147.1 | 143.6 |
| No. 3 | 156.8 | 152.8 | 150.8 | 162.0 | 159.5 | 159.0 | 158.9 |
| No. 4 | 155.0 | 142.1 | 145.7 | 135.9 | 135.7 | 135.5 | 134.0 | 134.0 |
| No. 5 | 86.0 | 78.8 | 81.8 | 77.4 | 79.5 | 77.7 | 77.6 | 76.0 |

TABLE 2.—ACID VALUES

| Days | 0 | 4 | 8 | 16 | 28 | 38 | 49 | 59 |
|---|---|---|---|---|---|---|---|---|
| Samples: | | | | | | | | |
| No. 1 | 17.8 | 25.5 | 31.6 | 51.9 | 53.5 | 64.9 | 72.5 | 75.0 |
| No. 2 | 20.4 | 23.6 | 36.9 | 55.7 | 62.0 | 72.8 | 82.5 | 85.8 |
| No. 3 | 20.5 | 18.0 | 22.6 | 31.7 | 40.4 | 43.7 | 52.8 | 58.3 |
| No. 4 | 16.5 | 24.8 | 29.5 | 49.5 | 53.4 | 59.0 | 75.2 | 73.9 |
| No. 5 | 20.0 | 19.2 | 24.2 | 26.4 | 21.7 | 30.1 | 30.8 | 41.8 |

TABLE 6.—AMINO ACIDS IN FISHMEAL

| Samples | No. 1 [2] | | No. 2 [3] | |
|---|---|---|---|---|
| | In g. per 100 g. Sample | In g. per 100 g. C.P. | In g. per 100 g. Sample | In g. per 100 g. C.P. |
| Amino Acids: | | | | |
| Glycine | 3.80 | 6.05 | 3.96 | 5.83 |
| Alanine | 4.10 | 6.50 | 4.69 | 6.91 |
| Valine | 3.54 | 5.63 | 4.06 | 5.98 |
| Leucine | 4.98 | 7.93 | 5.63 | 8.29 |
| Isoleucine | 3.07 | 4.90 | 3.50 | 5.16 |
| Serine | 2.78 | 4.43 | 3.11 | 4.58 |
| Threonine | 3.01 | 4.79 | 3.15 | 4.64 |
| Methionine | 2.13 | 3.39 | 2.39 | 3.52 |
| Crystine | 0.77 | 1.22 | 0.80 | 1.17 |
| Aspartic Acid | 6.54 | 10.40 | 6.83 | 9.91 |
| Glutamic Acid | 8.40 | 13.40 | 9.28 | 13.70 |
| Tyrosine | 2.26 | 3.60 | 2.48 | 3.65 |
| Phenyl alanine | 3.31 | 4.80 | 3.21 | 4.73 |
| Proline | 2.49 | 3.97 | 2.83 | 4.17 |
| Tryptophan | 0.75 | 1.19 | 0.77 | 1.13 |
| Arginine | 4.12 | 6.56 | 4.21 | 6.20 |
| Lysine | 5.58 | 8.88 | 6.20 | 9.13 |
| Histidine | 1.86 | 2.96 | 1.89 | 2.78 |
| Taurine [1] | 0.44 | 0.70 | 0.28 | 0.41 |
| Ammonia [1] | 1.03 | 1.64 | 1.06 | 1.56 |
| Total Amino Acid | 63.49 | 100.60 | 68.89 | 101.48 |
| Total Nitrogen | 10.05 | | 10.86 | |

[1] The ammonia and taurine are not included in the total nitrogen.
[2] Sample No. 1: A fishmeal produced by the present process using 0.54 grams of $H_2O_2$ and 0.0075 grams of butyl hydroxy toluene for 1 kg. of sardines at a cooking temperature of 55° C. and under drying conditions of a product temperature of 70° C. for 2 hours.
[3] Sample No. 2: A fishmeal produced by the conventional process from sardines at a cooking temperature of 100° C. and under drying conditions of a product temperature of 80° C. for 4 hours.

TABLE 3.—PEROXIDE VALUES [1]

| Days | 0 | 4 | 8 | 16 | 28 | 38 | 49 | 59 |
|---|---|---|---|---|---|---|---|---|
| Sample | | | | | | | | |
| No. 1 | 6.5 | 5.7 | Trace | Trace | Trace | Trace | Trace | Trace |
| No. 2 | 14.5 | 11.7 | Trace | Trace | Trace | Trace | Trace | Trace |
| No. 3 | Trace | Trace | Trace | Trace | Trace | Trace | Trace | Trace |
| No. 4 | 25.5 | 26.5 | 17.4 | 14.1 | Trace | Trace | Trace | Trace |
| No. 5 | 410.4 | 84.3 | 44.5 | 10.5 | Trace | Trace | Trace | Trace |

[1] Peroxide value decreases with the lapse of time before the analytical test is made by high temperature preservation because the value has already reached maximum and peroxide has gradually decomposed.

The samples were preserved at the room temperature (averaging 16°C.) for 13 days before putting them into a thermostatic and humidistatic chamber.

TABLE 4.—ORGANOLEPTIC TEST VALUES WITH ODORS

| Days | 0 | 4 | 8 | 16 | 28 | 38 | 49 | 59 |
|---|---|---|---|---|---|---|---|---|
| Sample: | | | | | | | | |
| No. 1 | N. | N. | N. | N. | N. | V.S.R. | V.S.R. | V.S.R. |
| No. 2 | N. | N. | N. | V.S.R. | V.S.R. | S.R. | S.R. | R. |
| No. 3 | N. | N. | N. | N. | N. | N. | N. | N. |
| No. 4 | N. | N. | V.S.R. | S.R. | R. | R. | R. | R. |
| No. 5 | V.S.R. | V.S.R. | S.R. | R. | E.R. | E.R. | E.R. | E.R. |

N.=Normal.
R.=Rancid.
V.S.R.=Very Slightly Rancid.
E.R.=Extremely Rancid
S.R.=Slightly Rancid.

TABLE 5.—COLOURS WITH FISHMEALS (BY HUNTER COLOR AND COLOR DIFFERENCE METER)

| Samples | Days | | | | | | | | |
|---|---|---|---|---|---|---|---|---|---|
| | 0 | | | | 30 | | | | 60 |
| | Test Method | | | | | | | | |
| | Hunter Values | | | Organoleptic Tests | Hunter Values | | | Organoleptic Tests | Hunter Values | | | Organoleptic Tests |
| | L | a | b | | L | a | b | | L | a | b | |
| No. 1 | 54.22 | 3.87 | 11.49 | Light olive | 55.41 | 3.87 | 12.51 | Light yellow | 56.40 | 4.50 | 12.47 | Light yellow |
| No. 2 | 55.86 | 5.15 | 11.70 | ...do... | 57.18 | 4.50 | 12.60 | ...do... | 57.71 | 4.73 | 12.65 | Do. |
| No. 3 | 52.25 | 4.22 | 11.80 | ...do... | 56.75 | 3.87 | 12.10 | Light olive | 55.23 | 3.58 | 13.00 | Light olive. |
| No. 4 | 56.57 | 4.82 | 12.74 | Light brown | 56.04 | 4.51 | 13.88 | Light yellowish brown | 56.92 | 5.25 | 14.74 | Light brown. |
| No. 5 | 52.63 | 5.58 | 15.77 | Clear yellowish brown | 50.02 | 7.11 | 17.50 | Dull orange | 51.96 | 9.08 | 16.63 | Do. |

NOTE.—L is proportional to the brightness. $\sqrt{a^2+b^2}$ is proportional to the coloring and $\theta$ (in tan $\theta = a/b$) is proportional to the hue.

TABLE 7.—INCREASE IN WEIGHT OF RATS BY GRAMS (AVERAGE VALUES OF EACH GROUP OF 10 FEMALE WISTAR RATS OF THE SAME LITTER)

| Days | 4 | 8 | 12 | 16 | 20 | 24 | 28 | Protein effects [2] |
|---|---|---|---|---|---|---|---|---|
| Samples [1]: | | | | | | | | |
| No. 1 | 16.9 | 33.2 | 44.4 | 55.1 | 65.9 | 79.2 | 90.2 | 17.6 |
| No. 2 | 16.1 | 31.3 | 41.2 | 51.2 | 62.9 | 75.1 | 85.9 | 17.0 |
| No. 3 | 12.4 | 22.8 | 31.2 | 42.7 | 52.5 | 67.2 | 75.0 | 14.8 |
| No. 4 | 16.4 | 28.7 | 39.5 | 48.9 | 60.0 | 72.1 | 77.5 | 15.0 |
| No. 5 | 12.9 | 20.2 | 25.8 | 35.9 | 39.9 | 47.2 | 52.6 | 12.1 |

[1] Sample No. 1: A fishmeal produced by the present process using 0.54 gram of $H_2O_2$ for 1 kg. of sardines at a cooking temperature of 55° C. and under drying conditions of a product temperature of 44° C. for 2 seconds.
Sample No. 2: A fishmeal produced using 0.54 gram of $H_2O_2$ and 0.0075 gram of butyl hydroxy toluene for 1 kg. of sardines at the same cooking temperature and under the same drying conditions as in Sample No. 1. But hydrogen peroxide is not added.
Sample No. 3: A fishmeal produced by the conventional process from sardines at a cooking temperature of 100° C. and under drying conditions of 80° C. for 3 hours.
Sample No. 4: A fishmeal produced by the conventional process from Alaska pollacks at a cooking temperature of 100° C. and under drying conditions of 80° C. for 3 hours.
Sample No. 5: Milk casein on the market.
[2] Protein effect: Increase in weight (gram). Intake nitrogen (gram).

TABLE 8.—COMPONENT OF FEED IN EACH TEST PLOT

| Basic contents, percent | Components of feed (percent) | | | | | Analytical percent of fishmeal and casein | | |
|---|---|---|---|---|---|---|---|---|
| | Protein | Salad oil | Liver oil | Ash [1] | a-starch | Protein | Fat | Ash [1] |
| | 10.0 | 8.0 | 2.0 | 5.0 | 75.0 | | | |
| Samples: | | | | | | | | |
| No. 1 | 14.4 | 6.9 | 2.0 | 3.2 | 73.5 | 69.7 | 8.3 | 12.6 |
| No. 2 | 15.1 | 6.8 | 2.0 | 3.1 | 73.0 | 66.3 | 8.2 | 12.3 |
| No. 3 | 15.5 | 6.3 | 2.0 | 3.2 | 73.0 | 64.5 | 11.3 | 11.4 |
| No. 4 | 19.5 | 6.4 | 2.0 | 0 | 72.1 | 51.2 | 8.2 | 27.4 |
| No. 5 | 10.6 | 8.0 | 2.0 | 4.8 | 74.6 | 94.2 | 0.1 | 1.8 |

[1] The ash contents were determined by the process of A. E. Harper (The Journal of Nutrition, Vol. 68. 405, 1959).

TABLE 9.—RATIO OF VITAMINS IN SAMPLE FEEDS (γ PER RAT)

| Vitamin | $B_1$ | $B_2$ | $B_6$ | Nicotinic acid | Calcium pantothenate |
|---|---|---|---|---|---|
| γ | 20 | 20 | 20 | 500 | 300 |

TABLE 10.—TEST ON THE DIGESTIVE RATE OF THE FISHMEALS USING FOWLS WITH ARTIFICIAL ANUS

| Items | Digestive rate of crude protein (percent) | Crude protein (percent) | Digestible protein (percent) |
|---|---|---|---|
| Samples: | | | |
| Horse mackerel meal of the present invention | 91.2 | 68.3 | 62.3 |
| White fishmeal | 89.3 | 67.4 | 60.2 |
| Horse mackerel meal of conventional process | 87.1 | 63.7 | 55.4 |

NOTE.—Digestive rate (percent) equals $100 - 100 \left( \frac{\text{Chrome oxide in the feed}}{\text{Chrome oxide in feces}} \times \frac{\text{Protein in feces (percent)}}{\text{Protein in the feed (percent)}} \right)$ Thus, the results of the above mentioned chemical analyses, animal tests and protein digestive rate tests proves that excellent fishmeals can be produced at a low cost by the present invention.

Figure 3:
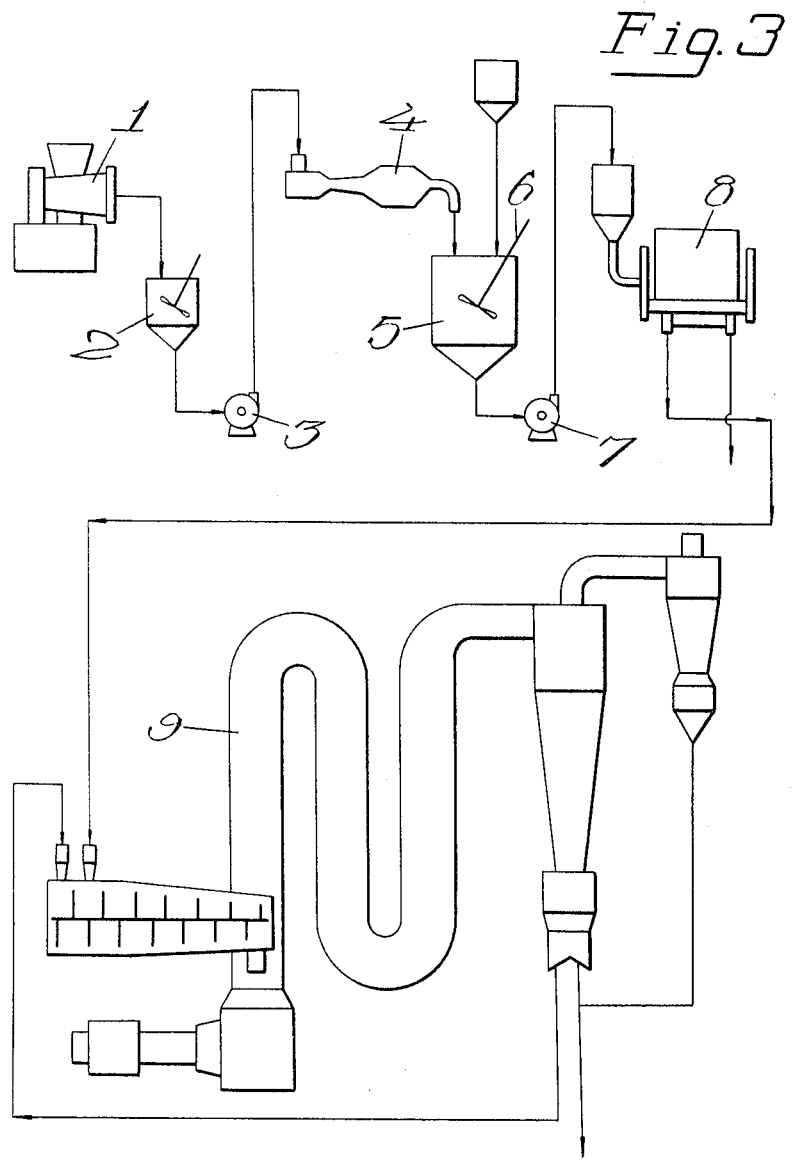
FIG. 3 shows a perspective view of the plant for producing fishmeal of this invention.

The following example is illustrative of details of the present invention. (See FIG. 3.)

EXAMPLE 100 kg. of sardines are ground with a meat grinder 1 having a plate mesh of 6 m./m. and mixed together with 30 kg. of water. The mixture is stirred in a hopper 2 to reduce its viscosity, and is fed to a steam injector 4 by a pump 3. The fish meat is instantaneously and uniformly heated to 55° C. and falls into a receptacle 5 having a stirrer 6. Prepared hydrogen peroxide water produced by diluting 120 grams of 30% hydrogen peroxide to be 10 times as much is gradually added to the fish meat at a consistant rate with stirring, and the mixture falls into a continuous solid bowl centrifuges 8 by pump 7 to separate liquids from wet solids. The wet solids are mixed with a previously dried fishmeal at a ratio of 1:1 to reduce the water content and are dried in a pneumatic conveying dryer 9 to obtain 18 kg. of a fishmeal having a mild smell.

What is claimed is:

1. A process for producing fishmeal comprising grinding fish, adding water to the ground fish to reduce the viscosity, heating instantaneously to about 50 to 65° C., adding hydrogen peroxide in an amount of 0.03 to 0.08% by weight of the fish meat to react at a temperature within said temperature range to produce antioxidative ability in the residual fat and oil of the fishmeal, separating solids from liquids and drying the separated solids as rapidly as possible.

2. A process for producing fishmeals comprising: grinding fish, rapidly heating the fish to about 50 to 65° C., adding hydrogen peroxide in an amount of 0.03 to 0.08% by weight of the fish meat to react at a temperature within said temperature range, separating the solids, and drying the solids as rapidly as possible.

3. The process of claim 2 wherein the amount of hydrogen peroxide added is 0.05 to 0.065%.

References Cited

UNITED STATES PATENTS 2,726,155 12/1955 Thurber et al. _____ 99—2
2,806,790 9/1957 Bedford _____ 99—7

RAYMOND N. JONES, *Primary Examiner.*

J. M. HUNTER, *Assistant Examiner.*

U.S. Cl. X.R.

99—2